Patented Mar. 17, 1936

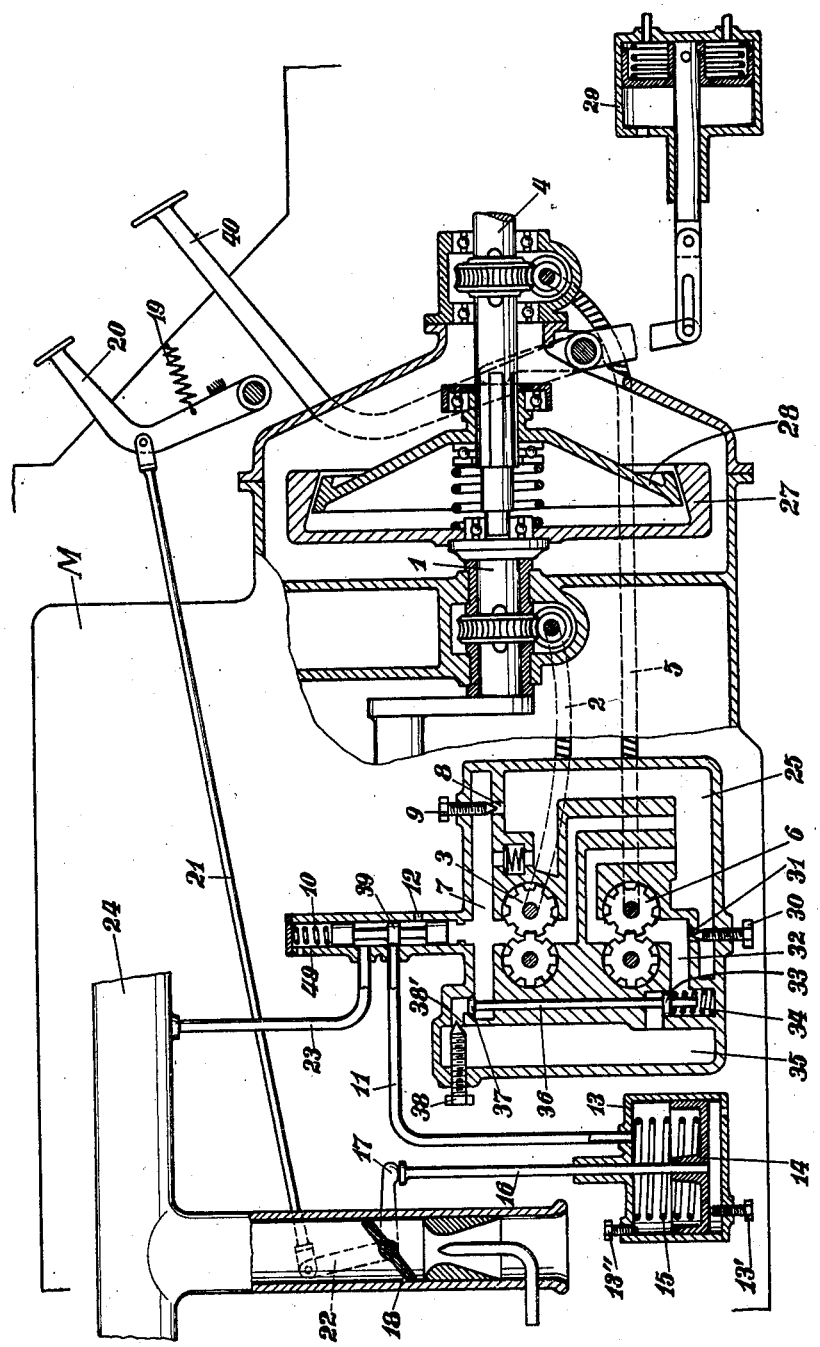

2,034,263

UNITED STATES PATENT OFFICE 2,034,263

FREEWHEELING MECHANISM OF MOTOR CARS

Karl Maybach, Friedrichshafen, Germany, assignor to Maybach-Motorenbau G. m. b. H., Friedrichshafen, Germany

REISSUED

Application June 20, 1933, Serial No. 676,633
In Germany July 1, 1932

5 Claims. (Cl. 192—.01)

My invention relates to motor cars in which means are provided for temporarily disconnecting the motor from the driving wheels for the purpose of free-wheeling, especially when driving on level roads or down hill. During such periods the speed of the motor is automatically reduced to the lowest possible minimum, so that the fuel consumption is also a minimum, and at the same time the working of the motor should be practically noiseless.

Generally there are auxiliary machines, such as dynamos and others, driven by the motor. Some of these machines serve for feeding energy to storage elements, such as electric accumulators or accumulators for compressed air, or the like. During the free-wheeling periods of the motor car, when the motor runs with reduced speed, the amount of energy fed to the accumulators is also lower than during the time the motor is running at normal speed. Consequently the accumulators may in certain cases run short of energy, especially when the driver of the car has been free-wheeling for long periods. To avoid the very disagreeable consequences of such running short of energy necessary for certain purposes and in cases of emergency, it has been suggested to provide more powerful auxiliary machines for feeding the accumulators. But such more powerful machines are also larger, heavier and more expensive, so that many disadvantages are connected therewith.

My invention gives a very simple yet effective solution for these conditions. I provide means which automatically alter the speed limit of the motor when disconnected to a higher limit for the periods during which the car runs faster than a certain minimum speed, that is for the period during which energy from the accumulators may be wanted. Thus, during the free-wheeling periods the motor has the lowest possible speed as long as the disconnected car in its speed runs below a certain limit, but as soon as the car exceeds this limit automatically a higher speed is set for the disconnected motor. Consequently, during this latter period the auxiliary machines also run with a higher speed and generally are apt to produce enough energy as is wanted during these periods, so that the accumulators need not be used at all. This is of importance especially with the electric system; in motor cars equipped with my invention there is no fear that the lights would go out even when free-wheeling for long periods and at higher speed.

According to my invention I have a first speed control means for the motor when disconnected, working in dependency of the motor itself, which causes the motor to run with a constant low speed. Then I have a second speed control means working in dependency of the speed of the car; this second means does not control the speed of the motor directly, but simply acts on the first control means in such manner that the automatically controlled motor speed is raised to another level as soon as the car in its speed exceeds a predetermined limit.

All this will be understood best when having reference to the drawing which represents an example embodying my invention.

The figure is a mere diagram showing in vertical section the main elements of the mechanism.

The motor is indicated at M. Its crank shaft 1 by means of flexible shaft 2 drives the fluid pump 3. Shaft 4 on the other side of friction clutch 27, 28 and in driving connection with the change speed gear and the driving wheels of the car (both not represented) by means of flexible shaft 5 drives fluid pump 6.

Pump 3 sucks out of well 25 and forces the fluid, oil for instance, into space 7. There is an opening 8 controlled by screw 9 by means of which it is possible to determine the liquid pressure within space 7 which shall act on control member 39 sliding within cylinder 49 and being under the reaction of spring 10. Tube 23 coming from the intake manifold of the motor M connects to cylinder 49 and is adapted to create vacuum (from the intake manifold) within tube 11 whenever control member 39 is moved downward; whereas upward movement of member 39 connects tube 11 with the open air by means of opening 12 in cylinder 49. Thus, control member 39 in accordance with the pressure prevailing in space 7 and following the slightest changes in this pressure connects tube 11 either with the vacuum of manifold 24 or with the open air of aperture 12, or, when the pressure in space 7 and that of spring 10 are equal it rests in its middle position.

Tube 11 is connected to cylinder 13 in which piston 14 is adapted to move up and down. One end of cylinder 13 is connected to the open air, whereas on the other side of piston 14 the vacuum of tube 11 may act against the re-action of spring 15. Consequently, whenever tube 11 is connected to the vacuum of manifold 24 piston 14 moves upward so that piston rod 16 pushes against lever 17 and thereby opens throttle 18. In other words, when the pump 3 decreases in revolutions so that the pressure in space 7 goes down also, control member 39 causes the vacuum of manifold 24 to move piston 14 upward and to open throttle 18 so that the motor, and with it pump 3, increases in speed again. Thus, the motor, if left to itself, will come to a constant speed which depends upon the setting of screws 9 and the features of spring 10. Screws 13' and 13" serve for limiting the stroke of piston 14.

Of course, throttle 18 can besides be moved at will by the driver by means of lever 20, rod 21 and lever 22, against the action of spring 19.

Pump 6, driven by shaft 4, in its speed depends upon the speed of the car. As long as the friction clutch 27, 28 is in engagement, both pumps, 3 and 6, rotate at equal speed; but when the car is de-clutched, for example by pushing down lever 40 or by means of vacuum as indicated at 29, and when the gas pedal 20 is released, the motor automatically decreases in speed and comes to a constant low speed as explained above, but pump 6 at the same time in its speed depends upon the speed of the car, which may be comparatively higher depending upon the road conditions.

Pump 6 sucks out of space 32 which is in connection with well 25 by means of aperture 31 controlled by screw 30. Consequently, pump 6 when exceeding in speed a certain limit, which is controlled by setting screw 30, causes a certain decrease in pressure within space 32 thereby opening valve 33 against the reaction of spring 34 and also against the reaction of the liquid pressure within space 7, because of valve 37 and connecting rod 36. The opening of valve 37 together with valve 33 causes an alteration in the pressure conditions within space 7. More fluid may now escape from space 7 through the opening 38' controlled by screw 38. Therefore, control member 39 begins to move downward, thereby causing an opening of throttle 18, and member 39 will return to its neutral middle position at a considerably higher speed of rotation of pump 3 and of the motor than before. The limit at which this will happen depends upon the setting of screw 38.

Thus screw 9 serves for setting the normal automatically controlled lowest motor speed. By means of screw 30 the vehicle speed is set, at which the automatically controlled motor speed changes automatically. And the new higher automatically controlled motor speed is determined by adequately setting screw 38.

The first mentioned motor speed should be as low as circumstances allow. The speed limit for the car at which the automatically controlled motor speed is altered may for example be at about 20 miles per hour. And the upper automatically controlled motor speed should be chosen in accordance with the prevailing conditions in every case.

I do not want to be limited to the details described or shown in the example, as many variations will occur to those skilled in the art.

What I claim is:

1. In a motor driven vehicle mechanism of the type described comprising: a member rotating in dependency of the motor speed, a member rotating in dependency of the car speed, a member for controlling the fuel intake of the motor, said fuel controlling means being under such influence of said member rotating in dependency of the motor speed that the motor automatically runs with a certain low idling speed when de-clutched, and means connected with both said rotating members adapted to alter automatically the controlled idling speed of the motor to a higher limit as soon as the car speed exceeds a predetermined limit.

2. In a motor driven vehicle in combination: a first fluid pump driven by the motor, a second fluid pump, driven by the car, a member for automatically controlling the fuel intake of the motor, means for operating said member, said operating means being controlled by the pressure of the liquid pumped by said first pump, and a valve controlled by said second pump, said valve being adapted to alter the pressure of the liquid pumped by said first pump.

3. In a motor driven vehicle in combination the elements as claimed in claim 1, and further including: means for setting the automatically controlled low speed for the motor, means for setting the automatically controlled higher speed for the motor, and means for setting the car speed at which the automatically controlled motor speed is to change.

4. In a motor driven vehicle mechanism of the type described comprising: automatic speed controlling means for the motor causing a certain low idling speed and a device for temporarily raising said idling speed limit to a higher but constant level, said latter device working in dependency of the car speed.

5. In a motor driven vehicle in combination: a first fluid pump driven by the motor, a second fluid pump driven by the car, a fluid pressure motor, a valve for controlling the pressure in said fluid pressure motor, said valve being influenced by the pressure of the liquid pumped by said first pump, a member for automatically controlling the fuel intake of the motor for driving the vehicle, said member being operated by said fluid pressure motor, and means adapted to alter the pressure of the liquid pumped by said first pump, said means being controlled by said second pump.

KARL MAYBACH.